(12) United States Patent
Yang et al.

(10) Patent No.: US 8,645,536 B2
(45) Date of Patent: Feb. 4, 2014

(54) IMAGE FORMING APPARATUS CONNECTED VIA NETWORK AND METHOD OF SETTING INFORMATION RELATING TO NETWORK

(75) Inventors: Seung-bae Yang, Seongnam-si (KR); Tomoaki Endoh, Suwon-si (KR); Kwang-seuk Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 12/545,997

(22) Filed: Aug. 24, 2009

(65) Prior Publication Data

US 2010/0058219 A1 Mar. 4, 2010

(30) Foreign Application Priority Data

Sep. 2, 2008 (KR) .............................. 10-2008-86323

(51) Int. Cl.
*G06F 15/173* (2006.01)
(52) U.S. Cl.
USPC ............................. 709/225; 709/220; 358/437
(58) Field of Classification Search
USPC ................. 709/220, 221, 223, 224, 225, 249; 358/437
See application file for complete search history.

(56) References Cited

U.S. PATENT DOCUMENTS

| | | | | |
|---|---|---|---|---|
| 4,001,783 A * | 1/1977 | Monahan et al. | ............. | 710/264 |
| 6,021,395 A * | 2/2000 | Goodwin, III | ................... | 705/20 |
| 6,182,146 B1 * | 1/2001 | Graham-Cumming, Jr. | . | 709/238 |
| 6,901,074 B1 * | 5/2005 | Yamasaki | ..................... | 370/400 |
| 7,589,855 B2 * | 9/2009 | Izumisawa et al. | .......... | 358/1.15 |
| 7,693,968 B2 * | 4/2010 | Aritomi | ........................ | 709/221 |
| 7,716,318 B2 * | 5/2010 | Kaneko | .......................... | 709/223 |
| 7,752,345 B2 * | 7/2010 | Duckett | ............................ | 710/8 |
| 7,755,780 B2 * | 7/2010 | Ohta et al. | .................... | 358/1.13 |
| 7,836,446 B2 * | 11/2010 | Ode | ............................... | 718/100 |
| 2003/0174360 A1 * | 9/2003 | Ohshima | ..................... | 358/1.15 |
| 2005/0105146 A1 * | 5/2005 | Tanaka | .......................... | 358/498 |
| 2006/0023697 A1 * | 2/2006 | Shore et al. | .................. | 370/352 |
| 2007/0168551 A1 | 7/2007 | Eisink | | |
| 2008/0126963 A1 | 5/2008 | Kim et al. | | |

FOREIGN PATENT DOCUMENTS

KR 10-2007-0003890 1/2007
KR 10-2008-0001959 1/2008

OTHER PUBLICATIONS

Korean Office Action dated Nov. 21, 2013 issued in KR Application No. 10-2008-0086323.

* cited by examiner

*Primary Examiner* — Emmanuel L Moise
*Assistant Examiner* — Marie Georges Henry
(74) *Attorney, Agent, or Firm* — Stanzione & Kim, LLP (57) ABSTRACT

A method of setting network information of an image forming apparatus connected via a network includes receiving network information of a new application to be installed on the image forming apparatus, and if network information of an existing application is the same as the network information of the new application, setting network information of one of the existing application and the new application to have priority.

15 Claims, 7 Drawing Sheets

| NETWORK PORT NUMBER | EXISTING APPLICATION | NEW APPLICATION |
|---|---|---|
| 8080 | built in application A | Custom application A |
| 20 | email notification application A | |
| 40 | web service application A | Custom web service application A |
| 50 | built in security service application A | Custom security service application A |

FIG. 3B

| NETWORK PORT NUMBER | APPLICATION A | | APPLICATION B | |
|---|---|---|---|---|
| | NAME | PRIORITY | NAME | PRIORITY |
| 8080 | $N_A$ | PA1 | $N_E$ | PA2 |
| 20 | $N_B$ | PB1 | $N_F$ | PB2 |
| 40 | $N_C$ | PC1 | $N_G$ | PC2 |
| 50 | $N_D$ | PD1 | $N_H$ | PD2 |

IMAGE FORMING APPARATUS CONNECTED VIA NETWORK AND METHOD OF SETTING INFORMATION RELATING TO NETWORK

CROSS-REFERENCE TO RELATED APPLICATIONS

This application claims priority under 35 U.S.C. §119(a) from Korean Patent Application No. 2008-86323, filed on Sep. 2, 2008, in the Korean Intellectual Property Office, the contents of which are incorporated herein by reference in its entirety.

BACKGROUND

1. Field of the Invention

The present general inventive concept relates to an image forming apparatus connected via a network and a method of setting information relating to the network, and more particularly, to an image forming apparatus connected via a network in order to adjust the use of information relating to a network between an existing application and a new application.

2. Description of the Related Art

Image forming apparatuses print, receive, or transmit data, and include printers, scanners, copy machines, fax machines, multi function peripherals (MFPs) combining these, or the like.

Recently, such image forming apparatuses include an operating system (OS), such as LINUX, and also support a network function. Accordingly, image forming apparatuses operate as a network computer having functions of printing, scanning, and faxing rather than as peripheral devices such as input and output devices.

Accordingly, in addition to applications which are provided by a manufacturer of an image forming apparatus and already exist in an image forming apparatus, various applications which have been developed by developers such as independent software vendors (ISVs) are installed in the image forming apparatus.

As image forming apparatuses operate increasingly as network computers and have been customized, network information of existing applications may be the same as that of applications to be newly installed. This causes conflict between both applications. Specifically, if an application to be newly installed uses the same port number as that of the existing application, the two applications conflict with each other, and may not operate normally.

SUMMARY

The present general inventive concept provides an image forming apparatus connected via a network to adjust the use of information relating to the network between applications if the same network information is assigned to an existing application and an application to be newly installed, and if two applications conflict with each other, and a method for setting network information.

Additional aspects and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of setting network information of an image forming apparatus connected via a network, the method including receiving network information of a new application to be installed on the image forming apparatus; and if network information of an existing application is the same as the network information of the new application, setting network information of one of the existing application and the new application to have priority.

The setting operation may include determining whether the network information of the existing application is the same as the network information of the new application; mapping the respective applications according to the same network information; and setting network information of one of the existing application and the new application to have priority.

The method may further include installing the new application on the image forming apparatus.

The network information may include one of a network port number and a domain name.

The setting operation may include setting network information of one of the existing application and the new application to have priority by removing or deactivating one of the applications.

The setting operation may include automatically setting an application to have priority according to a predefined scheme.

The method may further include providing a user interface (UI) window to select one of a plurality of applications having the same network information.

The setting operation may include setting network information of an application selected through the UI window to have priority.

The UI window may be provided on a display screen of an external terminal connected via a network or on a display screen of the image forming apparatus.

The foregoing and/or other features and utilities of the present general inventive concept may also be achieved by providing an image forming apparatus connected via a network, including a network interface unit to receive network information of a new application to be installed on the image forming apparatus; and a controlling unit to set network information of one of an existing application and a new application to have priority, if the network information of the existing application is the same as the network information of the new application.

The controlling unit may determine whether the network information of the existing application is the same as the network information of the new application; map the respective applications according to the same network information; and set network information of one of the existing application and the new application to have priority.

The controlling unit may set network information of one of the applications to have priority, and then install the new application on the image forming apparatus.

The apparatus may further include a storage unit to store applications having the same network information.

The network information may include one of a network port number and a domain name.

The controlling unit may set network information of one of the existing application and the new application to have priority by removing or deactivating one of the applications.

The controlling unit may automatically set an application to have priority according to a predefined scheme.

The apparatus may further include a user interface (UI) unit to provide a user interface (UI) window to select one of a plurality of applications having the same network information.

The controlling unit may set network information of an application selected on the UI window to have priority.

The UI window may be provided on a display screen of an external terminal connected via a network or on a display screen of the image forming apparatus.

The foregoing and/or other features and utilities of the present general inventive concept may also be achieved by providing a method of setting network information of an image forming apparatus connected via a network, the method including receiving network information of a new application to be installed on the image forming apparatus, and installing the new application on the image forming apparatus; and if a command to use the image forming apparatus is received, setting network information of one of an existing application and the new application having the same network information to have priority.

The foregoing and/or other aspects features and utilities of the present general inventive concept may also be achieved by providing a method of setting network information of an apparatus, the method including receiving network information of a different application from an existing application previously installed in the image forming apparatus, with respect to a same network port number, and setting network information of at least one of the existing application and the new application with a priority.

The foregoing and/or other aspects features and utilities of the present general inventive concept may also be achieved by providing an apparatus to set network information, including a network interface to receive network information of a different application from an existing application previously installed in the image forming apparatus, with respect to a same network port number, and a controller to set network information of at least one of the existing application and the new application with a priority.

The foregoing and/or other aspects features and utilities of the present general inventive concept may also be achieved by providing a computer-readable medium to contain computer-readable codes as a program to perform a method of setting network information of an apparatus, the method including receiving network information of a different application from an existing application previously installed in the image forming apparatus, with respect to a same network port number, and setting network information of at least one of the existing application and the new application with a priority.

The foregoing and/or other aspects features and utilities of the present general inventive concept may also be achieved by providing a method of setting network information of an apparatus, the method including receiving network information of different applications with respect to a same network port number, and setting network information of at least one of the different applications with a priority.

The method may further include receiving second network information of different second applications with respect to a same second network port number, and setting the second network information of at least one of the different second applications with another priority.

One of the priority and the another priority may have a high priority with respect to the other one of the priority and the another priority.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
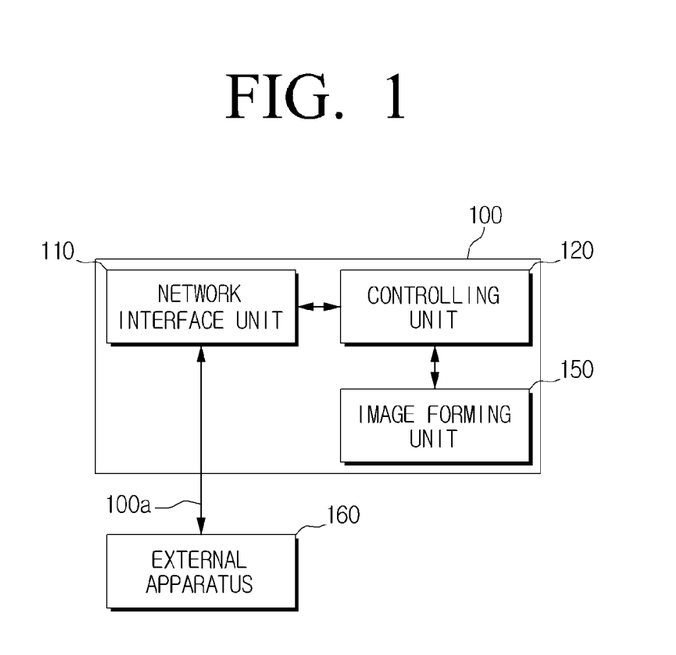
FIG. 1 is a block diagram illustrating an image forming apparatus connected via a network according to an exemplary embodiment of the present general inventive concept.

FIG. 1 is a block diagram illustrating an image forming apparatus connected via a network according to an exemplary embodiment of the present general inventive concept. Referring to FIG. 1, an image forming apparatus 100 connected via a network according to an exemplary embodiment of the present general inventive concept includes a network interface unit 110 and a controlling unit 120.

The image forming apparatus further includes an image forming unit 150 to feed a printing medium, to form an image on the printing medium using a printing element according to data received from an external apparatus 160 through a communication line, for example, a wired line or a wireless line, or a network, or data stored in an internal memory of the image forming apparatus, and to discharge the image-formed printing medium outside the image forming apparatus.

The network interface unit 110 receives network information of a new application to be installed. Hereinafter, information relating to network will be referred to as network information.

The new application may be all applications to be newly installed beside an application initially installed on the image forming apparatus 100 or a native application. Specifically, the new applications to be installed may be developed and installed by a developer in various types. For example, a new application may implement a policy to improve a work flow of the image forming apparatus 100 or a security policy to use the image forming apparatus 100.

Such applications may be downloaded from a server connected to the network interface unit 110 via a network, or may be directly provided by a host computer connected to the image forming apparatus 100.

The network information may be one of a network port number and a domain name. The detailed description relating thereto will be explained below with reference to the drawings.

The network interface unit 110 may be implemented using a network interface card (NIC) to communication with external terminals connected via the network. The network interface unit 110 may be mounted in the image forming apparatus 100 as a chip having the above functions.

If network information of an existing application is the same as network information of a new application to be installed, the controlling unit 120 may set network information of one of the existing application and the new application to have priority.

That is, the controlling unit 120 sets network information of one of the existing application and the new application to have priority by removing or deactivating one of the existing application and the new application.

Specifically, the controlling unit 120 compares network information of the existing application with that of the new application, maps the applications according to their respective network information in a mapping table, and sets network information of one of the existing application and the new application to have priority.

The image forming apparatus 100 connected via a network according to an exemplary embodiment of the present general inventive concept may be a multi function peripheral (MFP) combining functions of printing, scanning, and faxing.

Figure 2:
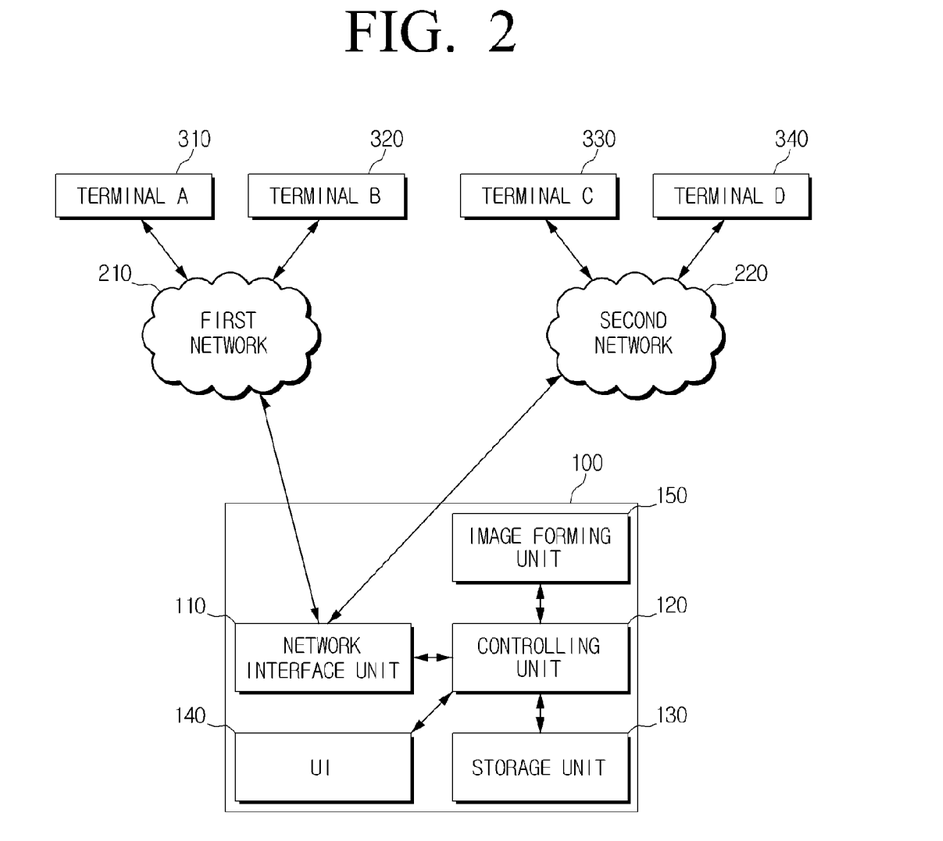
FIG. 2 is a detailed block diagram illustrating the image forming apparatus connected via the network of FIG. 1.

FIG. 2 is a block diagram illustrating the image forming apparatus 100 connected via the network of FIG. 1 in detail.

Referring to FIG. 2, the image forming apparatus 100 connected via a network according to an exemplary embodiment of the present general inventive concept may further include a storage unit 130 and a user interface (UI) 140 in addition to the network interface unit 110 and the controlling unit 120. The image forming apparatus 100 connected via a network according to an exemplary embodiment of the present general inventive concept may be connected to a terminal A 310 and a terminal B 320 via a first network 210, and may be connected to a terminal C 330 and a terminal D 340 via a second network 220.

The first network 210 having an IP address 168.219.12.0 assigns an IP address 168.219.12.10 to the terminal A 310, an IP address 168.219.12.20 to the terminal B 320, and an IP address 168.219.12.30 to the image forming apparatus 100 such that a single network is generated. Another network including the terminal C 330, the terminal D 340, and the image forming apparatus 100 may also be formed over the second network 220.

For example, the image forming apparatus 100 connected to the first network 210 is assigned various network port numbers such as 168.219.12.30:8080 and 168.219.12.30:20 under the IP address 168.219.12:30 according to a predetermined rule to assign a network port number to each application. For example, network port number 8080 should be used in order to provide an Internet service (network port number 8080 is more practical to use than network port number 80.

The above-described address may include a first portion corresponding to the IP address and a second portion corresponding to the network port number. Therefore, a plurality of network port numbers can be combined with a single IP address according to an application applied to the image forming apparatus to perform a corresponding function or method.

Figure 3A:
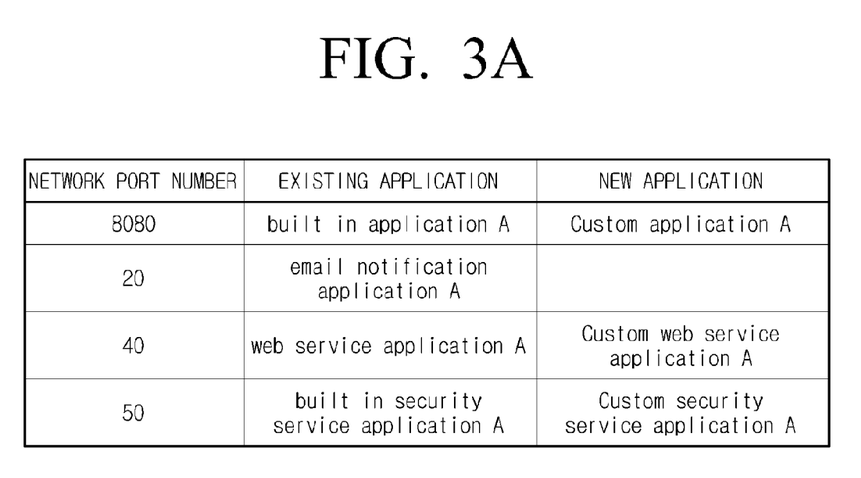
FIGS. 3A and 3B are mapping tables according to an exemplary embodiment of the present general inventive concept.
Figure 3B:
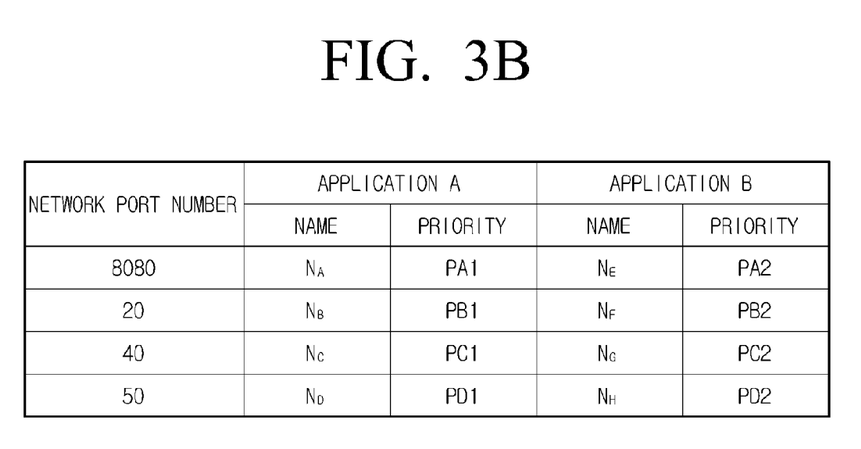

The storage unit 130 may store applications having the same network information in a mapping table. Referring to FIG. 3, an existing application and a new application are mapped according to their network port numbers among network information. Regarding network port number 20 of FIG. 3, an existing application is installed on the image forming apparatus 100, but a new application is not installed. If a new application using network port number 20 is installed later, the blank cell of the mapping table in FIG. 3 may be filled so as to be mapped with the existing application, that is, the application for performing e-mail notification.

The UI 140 may provide a UI window to select one of a plurality of applications having the same network information. The UI window may be implemented on a screen such as a liquid crystal display (LCD) provided on the image forming apparatus 100.

The UI window may be implemented using a screen of an external terminal connected to the image forming apparatus 100 via a network. The external terminal may be an image forming apparatus having a network function.

Various exemplary embodiments of the present general inventive concept will be explained with reference to FIGS. 2, 3A and 3B. Hereinbelow, network information will be explained using a network port number.

If the image forming apparatus 100 receives a user identification (ID) from a radio-frequency identification (RFID) tag, or an external terminal connected via a network commands the image forming apparatus 100 to perform a printing job in this exemplary embodiment of the present general inventive concept, network port number 50 may be assigned to a security service application A providing a security service, for example receiving a user ID as illustrated in FIG. 3.

In this exemplary embodiment of the present general inventive concept, if a user desires to install a new application which uses a digital watermark beside the user ID so as to enable an administrator to confirm content of data to be printed and to perform a printing job in the image forming apparatus 100 in order to achieve high level security, the new application to be additionally installed should use network port number 50.

In this case, the image forming apparatus 100 according to the exemplary embodiment of the present general inventive concept may receive network port number 50 of the new application from the network interface unit 110.

Referring to FIG. 3A, the controlling unit 120 may map on network port number 50 the new application with the existing application, that is, a custom security service application A with a built-in security service application A. The applications having the same network port number 50 may be mapped in a mapping table, and the mapping table may be stored in the storage unit 130.

As the above applications have the same network port number 50, the controlling unit 120 may set one of the new application and the existing application to have priority on network port number 50.

The controlling unit 120 sets network information of one of the applications to have priority, and then installs the new application on the image forming apparatus 100.

In doing so, conflict between an existing application and a new application may be avoided since it is possible to adjust the use of the same network port number. Various applications which were not expected at the time of launching the image forming apparatus 100 may be additionally installed without facing conflicts regarding network information such as their network port numbers. Accordingly, an existing application may be securely supplemented.

The controlling unit 120 may employ various methods to set one of network port numbers of the existing application and the new application to have priority.

For example, the controlling unit 120 may automatically set a new application to have priority according to a predetermined method. Priority may be preset according to the type of application or the fabricator of the application, or may be preset directly by a user or an administrator.

A user may select an application using a UI window of the UI 140 so that the selected application has priority on the network port number. The UI window may display check boxes adjacent to the new application and the existing application which are mapped with each other with respect to network port number 50, and a user may set the priority by selecting one of the check boxes. A user can select one of applications assigned the same network information, that is the same network port number, and thus user convenience is obtained.

It is possible that a user change the priority by assigning a priority, for example, a first top priority, a lower priority, or different priority, to the respective applications, through the network print numbers.

The priority can be automatically set according to a latest version of the applications, an order where the image forming apparatus receives the respective applications, or a determination of which one is an existing application previously installed in the image forming apparatus or which one is a new application currently received in the image forming apparatus.

The network port number is used as network information in this exemplary embodiment of the present general inventive concept, but a domain name or a uniform resource location (URL) may also be used as network information.

While an IP address having a network port number such as 168.219.12.30:XX is assigned to each application of the image forming apparatus 100 in this exemplary embodiment of the present general inventive concept, a domain name such as 168.219.12.30/print, 168.219.12.30/scan, 168.219.12.30/fax, 168.219.12.30/security, or 168.219.12.30/maintenance may also be assigned to each application of the image forming apparatus 100.

The above exemplary embodiment and the following exemplary embodiment of the present general inventive concept are common with each other in that a network port number is used as network information, but differ in that a domain name is assigned instead of an IP address. Therefore, the detailed description will be omitted.

Referring to FIG. 3B, priority PA1 is assigned to an application Na, and priority PA2 is assigned to an application Ne to correspond to the network port number 8080. Priorities PB1, PB2, PC1, PC2, PD1, and PD2 are assigned to applications Nb, Nc, Nd, Nf, Ng, and Nh, respectively.

The priorities PA1 and PA2 may have different priorities, for example, a high priority and a low priority, and priorities PB1, PB2, PC1, PC2, PD1, and PD2 may have different, for example, a high priority and a low priority. However, the present general inventive concept is not limited thereto. Only priorities PA2, PB2, PC2, and PD2 are assigned to the applications Ne, Nf, Ng, and Nh, respectively, as a high priority without assigning priorities PA1, PB1, PC1, and PD1 to applications Na, Nb, Nc, Nd, respectively, as a low priority.

There may have different priorities between applications with respect to the same network port number. However, it is possible that there may be different priorities between applications corresponding to different network port numbers. For example, PB2 and PC2 of corresponding applications Nf and Ng may have different priorities with respect to each other.

Figure 4:
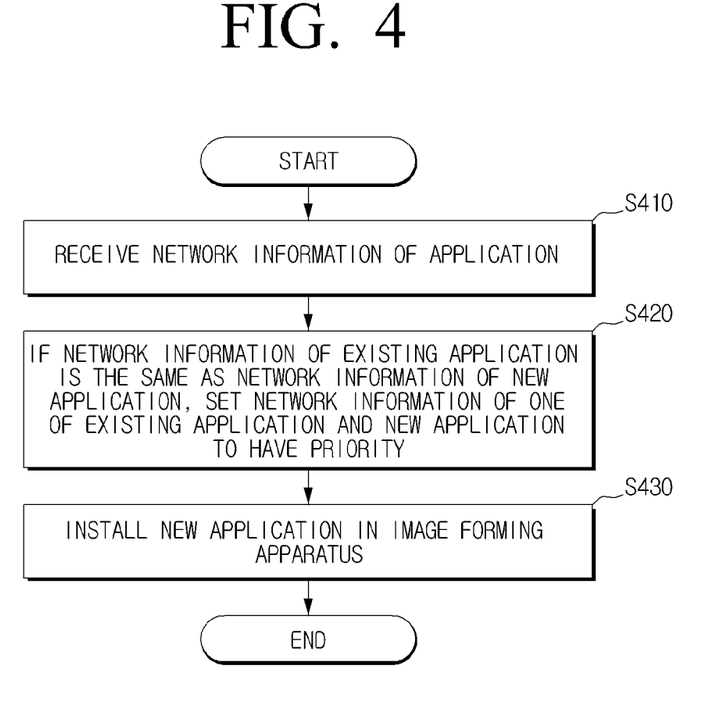
FIG. 4 is a flowchart provided to explain a method for setting network information of an image forming apparatus connected via a network according to an exemplary embodiment of the present general inventive concept.

FIG. 4 is a flowchart provided to explain a method for setting network information of an image forming apparatus connected via a network according to an exemplary embodiment of the present general inventive concept. Referring to FIG. 4, the network interface unit 110 receives network information of an application to install in operation S410.

If network information of an existing application is the same as network information of a new application to be installed, the controlling unit 120 sets network information of one of the existing application and the new application to have priority in operation S420.

In operation S420, the controlling unit 120 may automatically set an application to have priority according to a predetermined method.

The controlling unit 120 installs the new application on the image forming apparatus 100 in operation S430.

According to FIG. 4, network information is received in operation S410, network information of one of the applications has priority in operation S420, and a new application is finally installed in operation S430. Alternatively, if network information is received in operation S410, a new application is installed in operation S430, and then network information of one of the applications has priority in operation S420.

Figure 5:
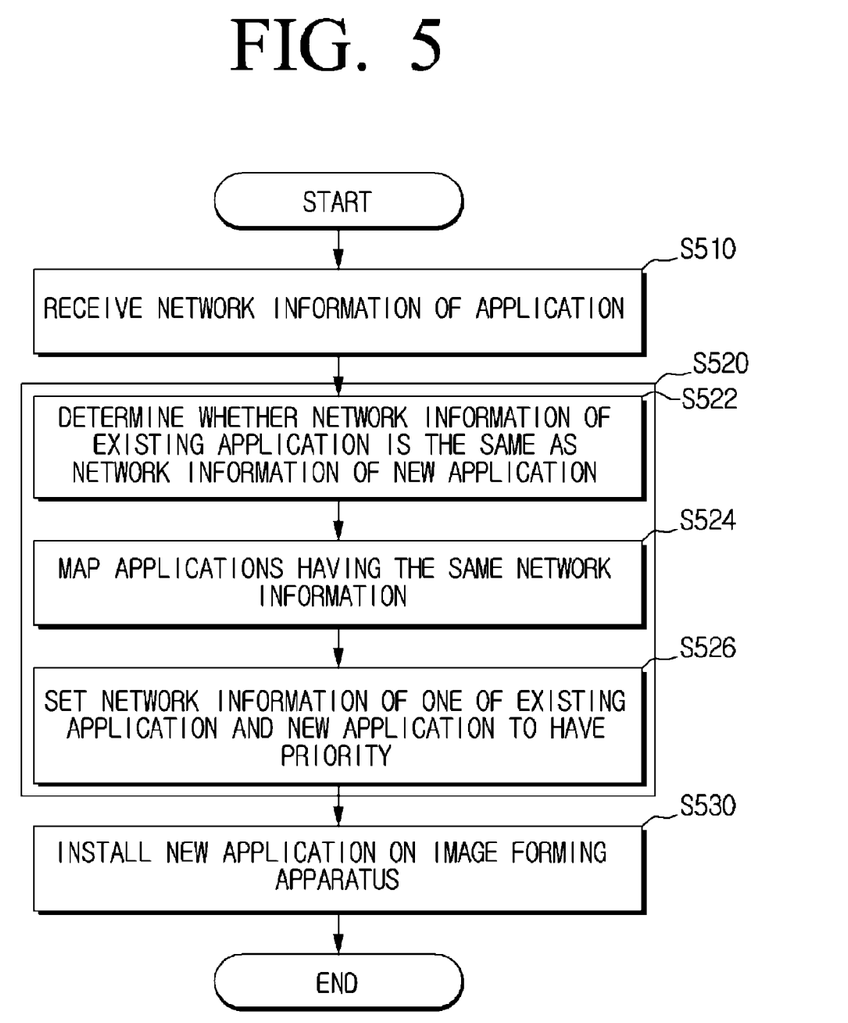
FIG. 5 is a detailed flowchart provided to explain the method for setting network information of an image forming apparatus connected via a network of FIG. 4.

FIG. 5 is a flowchart provided to explain the method of FIG. 4 in more detail. Referring to FIG. 5, the process of setting priority in operation S520 is illustrated in detail, and the other processes are the same as those of FIG. 4.

According to a method for setting network information of an image forming apparatus 100 connected via a network according to an exemplary embodiment of the present general inventive concept, the network interface unit 110 receives network information of an application to install in operation S510.

The controlling unit 120 determines whether network information of an existing application is the same as network information of a new application in operation S522.

The controlling unit 120 maps applications according to the same network information in a mapping table in operation S524, and sets network information of one of the existing application and the new application to have priority in operation S526.

The controlling unit 120 installs the new application on the image forming apparatus 100 in operation S530.

Figure 6:
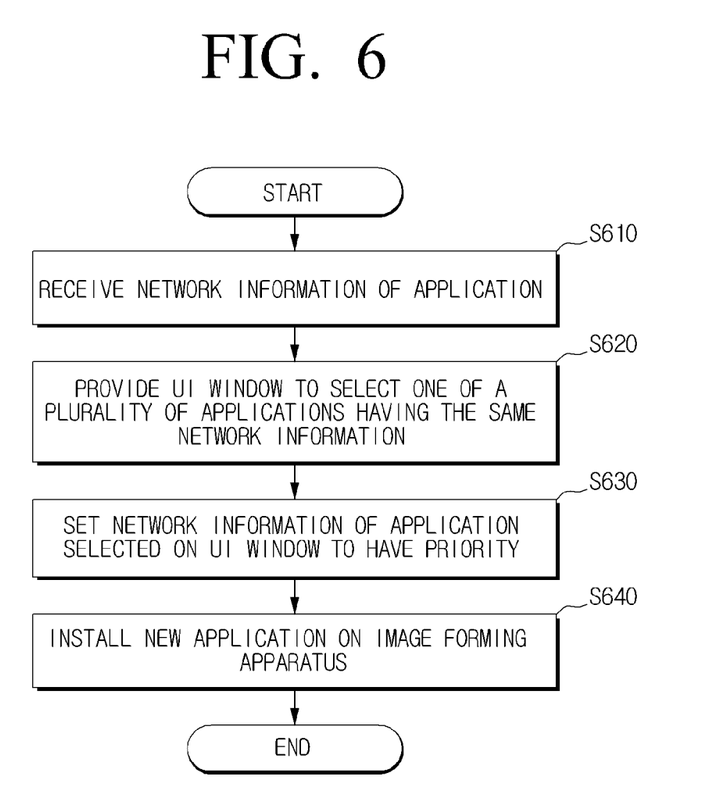
FIG. 6 is a flowchart provided to explain a method for setting network information of an image forming apparatus connected via a network according to another exemplary embodiment of the present general inventive concept.

FIG. 6 is a flowchart provided to explain a method for setting network information of an image forming apparatus connected via a network according to another exemplary embodiment of the present general inventive concept. Referring to FIG. 6, the network interface unit 110 receives network information of an application to install in operation S610.

The UI 140 provides a UI window to select one of a plurality of applications having the same network information in operation S620. The controlling unit 120 sets network information of the application selected through the UI window to have priority in operation S630.

The controlling unit 120 installs a new application on the image forming apparatus 100 in operation S640.

Figure 7:
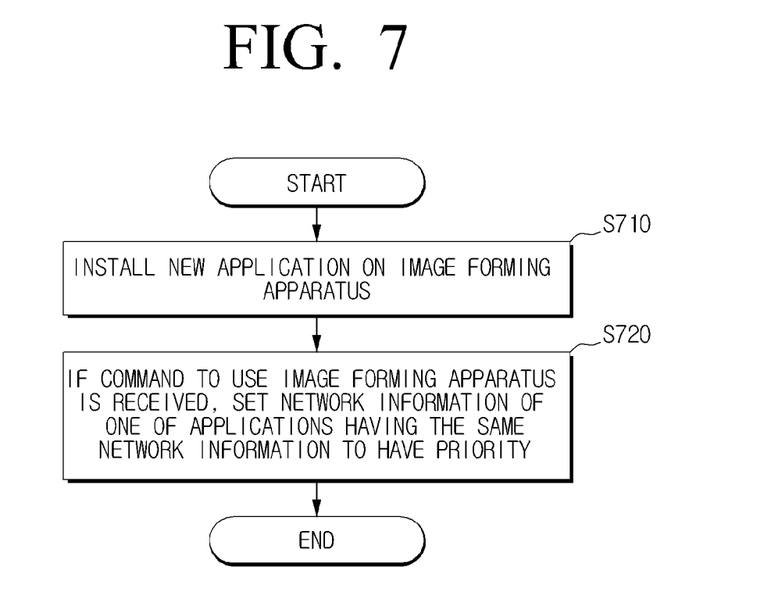
FIG. 7 is a flowchart provided to explain a method for setting network information of an image forming apparatus connected via a network according to still another exemplary embodiment of the present general inventive concept.

FIG. 7 is a flowchart provided to explain a method for setting network information of an image forming apparatus connected via a network according to still another exemplary embodiment of the present general inventive concept.

Referring to FIG. 7, network information of a new application to be installed on the image forming apparatus 100 is received, and the new application is installed on the image forming apparatus 100 in operation S710.

If a command to use the image forming apparatus 100 is received, network information of one of the existing application and the new application having the same network information is set to have priority in operation S720.

According the method for setting network information of an image forming apparatus connected via a network of FIG. 7, if a command to use the image forming apparatus 100, that is the command to perform printing, scanning, or faxing, is received after a new application is installed on the image forming apparatus 100, one of the existing application and the new application having the same network information may be set to have priority.

As described in FIGS. 4 to 6, the process of installing an application includes the process of setting priority. However, the process of setting priority may be performed independently after applications are installed.

The descriptions same as in the prior embodiments are omitted from the explanations of FIG. 7.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of setting a communication port of an image forming apparatus connected to a network, the method comprising:
   receiving a first communication port of a new application to be installed on the image forming apparatus, the first communication port being useable by the new application to communicate via the network;
   determining whether a second communication port of an existing application is the same as the first communication port of the new application; and
   if the second communication port of the existing application is the same as the first communication port of the new application, setting one of the first communication port and the second communication port to have priority over another one of the first communication port and the second communication port, the second communication port being useable by the existing application to communicate via the network; and
   installing the new application on the image forming apparatus,
   wherein the setting operation comprises setting one of the first communication port and the second communication port to have priority by removing or deactivating one of the applications.

2. The method of claim 1, wherein the setting operation comprises:
   mapping the respective applications according to the same communication port; and
   setting one of the first communication port and the second communication port to have priority.

3. The method of claim 1, wherein the setting operation comprises:
   automatically setting an application to have priority according to a predefined scheme.

4. The method of claim 1, further comprising:
   providing a user interface (UI) window to select one of a plurality of applications having the same communication port.

5. The method of claim 4, wherein the setting operation comprises:
   setting network information of an application selected through the UI window to have priority.

6. The method of claim 4, wherein the UI window is provided on a display screen of an external terminal connected via a network or on a display screen of the image forming apparatus.

7. An image forming apparatus connected via a network, comprising:
   a storage unit to store applications having a same communication port;
   a network interface unit to receive a first communication port of a new application to be installed on the image forming apparatus, the first communication port being useable by the new application to communicate via the network; and
   a controlling unit to determine whether a second communication port of an existing application is the same as the first communication port of the new application, and to set one of the first communication port and the second communication port of the existing application to have priority over another one of the first communication port and the second communication port, if the second communication port of the existing application is the same as the first communication port of the new application, the second communication port being useable by the existing application to communicate via the network, where the controlling unit sets the communication port of one of the application to have priority, and then installs the new application on the image forming apparatus,
   wherein the controlling unit sets one of the first communication port and the second communication port to have priority by removing or deactivating one of the applications.

8. The apparatus of claim 7, wherein the controlling unit maps the respective applications according to the same communication port, and sets one of the first communication port and the second communication port to have priority.

9. The apparatus of claim 7, wherein the controlling unit automatically sets an application to have priority according to a predefined scheme.

10. The apparatus of claim 7, further comprising:
    a user interface (UI) unit to provide a user interface (UI) window to select one of a plurality of applications having the same communication port.

11. The apparatus of claim 10, wherein the controlling unit sets the communication port of an application selected on the UI window to have priority.

12. The apparatus of claim 10, wherein the UI window is provided on a display screen of an external terminal connected via a network or on a display screen of the image forming apparatus.

13. A method of setting a communication port of an image forming apparatus connected via a network, the method comprising:

receiving a first communication port of a new application to be installed on the image forming apparatus, and installing the new application on the image forming apparatus, the first communication port being useable by the new application to communicate via the network;

determining whether a command to use the image forming apparatus is received and a second communication port of an existing application is the same as the first communication port of the new application; and if the command to use the image forming apparatus is received and the second communication port of the existing application is the same as the first communication port of the new application, setting one of the first communication port and the second communication port by removing or deactivating one of the applications to have priority over another one of the first communication port and the second communication port, the second communication port being useable by the existing application to communicate via the network.

14. A method of setting a communication port of an apparatus, the method comprising:

receiving a first communication port of different first applications with respect to a same first network port number;

setting the first communication port of at least one of the different first applications with a first priority, the first communication port being useable by the at least one of the first applications to communicate via a network;

receiving a second communication port of different second applications with respect to a same second network port number; and setting the second communication port of at least one of the different second applications with a second priority, the second communication port being useable by the at least one of the different second applications to communicate via the network, wherein the setting operation comprises setting one of the first communication port and the second communication port to have priority by removing or deactivating one of the applications.

15. The method of claim 14, wherein one of the first and second priorities has a high priority with respect to the other one of the first and second priorities.

\* \* \* \* \*